(12) United States Patent
Taguchi et al.

(10) Patent No.: US 10,835,921 B2
(45) Date of Patent: Nov. 17, 2020

(54) METHOD FOR PRODUCING BUILDING MATERIAL

(71) Applicant: Nichiha Corporation, Nagoya-shi, Aichi (JP)

(72) Inventors: Hiroyuki Taguchi, Nagoya (JP); Miho Murase, Nagoya (JP)

(73) Assignee: NICHIHA CORPORATION, Nagoya (JP)

( * ) Notice: Subject to any disclaimer, the term of this patent is extended or adjusted under 35 U.S.C. 154(b) by 0 days.

(21) Appl. No.: 15/251,872

(22) Filed: Aug. 30, 2016

(65) Prior Publication Data
US 2017/0056922 A1   Mar. 2, 2017

(30) Foreign Application Priority Data
Aug. 31, 2015   (JP) .................. 2015-171134

(51) Int. Cl.
 *B05D 3/06*   (2006.01)
 *C04B 41/52*   (2006.01)
 (Continued)

(52) U.S. Cl.
 CPC ............ *B05D 3/065* (2013.01); *C04B 41/009* (2013.01); *C04B 41/52* (2013.01); *C04B 41/71* (2013.01); *Y02W 30/97* (2015.05)

(58) Field of Classification Search
 CPC ........................................................ E04C 2/04
 See application file for complete search history.

(56) References Cited

U.S. PATENT DOCUMENTS

| 4,192,690 A | * | 3/1980 | Meyer | ............. B28C 5/402 |
| | | | | 106/639 |
| 2006/0182946 A1 | * | 8/2006 | Zarb | ............. C04B 18/24 |
| | | | | 428/312.4 |

(Continued)

FOREIGN PATENT DOCUMENTS

| JP | 61-168584 A | 7/1986 |
| JP | 63-4943 A | 1/1988 |

(Continued)

OTHER PUBLICATIONS

Japanese Office Action, dated Jan. 8, 2019, for Japanese Application No. 2015-171134, with an English machine translation.

(Continued)

*Primary Examiner* — Joel G Horning
(74) *Attorney, Agent, or Firm* — Birch, Stewart, Kolasch & Birch, LLP (57) ABSTRACT

A method for producing a building material includes a first step of applying a first ultraviolet-curable paint onto an inorganic material containing a woody reinforcement and incompletely curing the first ultraviolet-curable paint, a second step of applying a second ultraviolet-curable paint and completely curing the second ultraviolet-curable paint, a third step of polishing the completely cured second ultraviolet-curable paint to smoothen a surface of the completely cured second ultraviolet-curable paint, and a fourth step of applying an enamel paint and curing the enamel paint. In the second step, the second ultraviolet-curable paint is applied while the first ultraviolet-curable paint is incompletely cured.

11 Claims, 3 Drawing Sheets

(51) Int. Cl.
*C04B 41/71* (2006.01)
*C04B 41/00* (2006.01)

(56) References Cited

U.S. PATENT DOCUMENTS

| 2007/0042192 A1* | 2/2007 | Nguyen | C04B 41/009 428/420 |
| 2010/0190031 A1* | 7/2010 | Questel | C04B 41/009 428/689 |

FOREIGN PATENT DOCUMENTS

| JP | 4-7065 A | | 1/1992 | |
| JP | 4-49034 A | | 2/1992 | |
| JP | 06321658 A | * | 11/1994 | C04B 41/009 |
| JP | 8-67546 A | | 3/1996 | |
| JP | 2000-280398 A | | 10/2000 | |
| JP | 2003-213839 A | | 7/2003 | |
| JP | 2011-163069 A | | 8/2011 | |
| JP | 2015-71288 A | | 4/2015 | |
| JP | 2015-120339 A | | 7/2015 | |

OTHER PUBLICATIONS

A response to the European Office Action submitted in the corresponding European Patent Application No. 1684458.4 dated Jul. 10. 2017.
European Patent Office Communication and extended search report issued in the corresponding European Patent Application No. 16184458.4 dated Jan. 9, 2017.
European Patent Office Communication under Rule 71(3) EPC issued in the corresponding European Patent Application No. 16184458.4 dated Jan. 25, 2018.
European Patent Office Decision to grant a European patent pursuant to Article 97(1) EPC issued in the corresponding European Patent Application No. 16184458.4 dated Jun. 1, 2018.

* cited by examiner

METHOD FOR PRODUCING BUILDING MATERIAL

CROSS REFERENCES TO RELATED APPLICATIONS

This application is based on Japanese Patent Application No. 2015-171134 filed in the Japanese Patent Office on Aug. 31, 2015, the entire contents of which are hereby incorporated by reference.

BACKGROUND OF THE INVENTION

1. Field of the Invention

The present invention relates to a building material such as a siding board.

2. Description of the Related Art

Fiber reinforced cement siding boards have been used as building materials for exterior walls and interior walls of buildings.

Fiber reinforced cement siding boards are building materials that use inorganic materials such as wood cement board, wood wool cement board, pulp fiber reinforced cement board, wood flake reinforced cement calcium silicate board, and wood fiber reinforced cement calcium silicate board.

In recent years, there has been an increasing demand for further improving exterior design of building materials. In fiber reinforced cement siding boards that use inorganic materials as base materials, a paint is applied onto the surface of the fiber reinforced cement siding boards to form a coating for the purpose of improving the design.

To further improve the design, Japanese Unexamined Patent Application Publication No. 2011-163069 discloses a technique in which the surface of an inorganic material is polished, a coating is formed on the polished surface, and the uppermost surface is mirror-finished.

To improve the bending strength and toughness, woody reinforcements are often used as reinforcing materials for such inorganic materials serving as base materials.

However, when an inorganic material containing a woody reinforcement such as a flake or pulp is polished and a paint is applied thereon to form a coating, the woody reinforcement rises to the inside of the coating, which sometimes degrades the appearance of the coating surface.

In particular, when mirror finishing is performed to smoothen the outermost surface, the quality of mirror finishing on the coating surface may be insufficient. One of the measures is not to use the woody reinforcement. However, if the woody reinforcement is not used, the bending strength and toughness of the inorganic material degrade.

SUMMARY OF THE INVENTION

It is an object of the present invention to provide a method for producing a building material in which a coating on an inorganic material containing a woody reinforcement has a better mirror-finished surface.

To achieve the above object, a method for producing a building material according to aspects of the present invention includes a first step of applying a first ultraviolet-curable paint onto an inorganic material which contains a woody reinforcement and whose surface is polished and incompletely curing the first ultraviolet-curable paint, a second step of applying a second ultraviolet-curable paint and completely curing the second ultraviolet-curable paint, a third step of polishing the completely cured second ultraviolet-curable paint to smoothen a surface of the completely cured second ultraviolet-curable paint, and a fourth step of applying an enamel paint and curing the enamel paint. In the second step, the second ultraviolet-curable paint is applied while the first ultraviolet-curable paint is incompletely cured.

The present invention can provide a building material that is a fiber reinforced cement siding board formed of an inorganic material containing a woody reinforcement and that has a better mirror-finished design surface.

DESCRIPTION OF THE PREFERRED EMBODIMENTS

A production method according to an embodiment of the present invention includes a first step of applying a first ultraviolet-curable paint onto an inorganic material containing a woody reinforcement and incompletely curing the first ultraviolet-curable paint, a second step of applying a second ultraviolet-curable paint and completely curing the second ultraviolet-curable paint, a third step of polishing the completely cured second ultraviolet-curable paint to smoothen a surface of the completely cured second ultraviolet-curable paint, and a fourth step of applying an enamel paint and curing the enamel paint. In the second step, the second ultraviolet-curable paint is applied while the first ultraviolet-curable paint is incompletely cured.

Examples of the woody reinforcement include wood powder, wood wool, wood flake, wood fiber, wood fiber bundle, and pulp.

These woody reinforcements may be used in combination of two or more.

Examples of the inorganic material constituting the building material include wood cement board, wood wool cement board, pulp fiber reinforced cement board, wood flake reinforced cement calcium silicate board, and wood fiber reinforced cement calcium silicate board.

Each of the inorganic materials contains a woody reinforcement. The content of the woody reinforcement is not particularly limited. The inorganic material preferably contains 5 to 30 mass % of the woody reinforcement in terms of solid content because such an inorganic material has excellent bending strength and toughness.

A sealer coating made of, for example, epoxy resin, acrylic resin, or urethane resin may be formed on the surface of the inorganic material.

The sealer coating is preferably formed because the adhesion between the inorganic material and a first ultraviolet-cured coating is improved.

Even if the inorganic material is polished, the surface of the inorganic material has minute irregularities. Therefore, coatings are formed so that the inorganic material has a mirror-finished surface.

In the method for producing a building material according to this embodiment, a coating of a first ultraviolet-curable paint is formed on the surface of the inorganic material, a coating of a second ultraviolet-curable paint is formed on the surface of the coating of the first ultraviolet-curable paint, and a coating of an enamel paint is formed on the surface of the coating of the second ultraviolet-curable paint.

The first ultraviolet-curable paint is cured by irradiation with ultraviolet rays, and thus has a curing rate higher than that of aqueous emulsion paints and solvent paints.

Furthermore, the curing rate of the first ultraviolet-curable paint can be controlled by controlling the ultraviolet dose onto the first ultraviolet-curable paint.

Since a woody reinforcement that is likely to protrude from the surface of the inorganic material can be fixed inside the coating of the first ultraviolet-curable paint, the surface of the coating of the first ultraviolet-curable paint can be made smooth. The first ultraviolet-curable paint preferably contains, as a main component, at least one of acrylic resin, epoxy resin, and urethane resin. The first ultraviolet-curable paint is preferably applied in such an amount that a coating formed of the first ultraviolet-curable paint has a thickness of 10 to 150 μm.

In the first step, the first ultraviolet-curable paint is incompletely cured.

The term "incomplete curing" means that an ultraviolet-curable paint is cured at an ultraviolet dose lower than the ultraviolet dose at which the ultraviolet-curable paint is completely cured.

In other words, the term "incomplete curing" means that the curing of a paint is stopped while the paint can be further cured if irradiated with ultraviolet rays.

The second ultraviolet-curable paint is used to further smoothen the surface of the building material.

The second ultraviolet-curable paint is also cured by irradiation with ultraviolet rays, and preferably contains, as a main component, at least one of acrylic resin, epoxy resin, and urethane resin.

In the second step, the second ultraviolet-curable paint is preferably applied in such an amount that a coating formed of the second ultraviolet-curable paint has a thickness of 30 to 150 μm.

In the second step, the second ultraviolet-curable paint is applied while the first ultraviolet-curable paint is incompletely cured, and the first ultraviolet-curable paint is completely cured by the irradiation with ultraviolet rays in the second step. Since the first ultraviolet-curable paint is incompletely cured, but is cured to a certain degree, the woody reinforcement protruding from the inorganic material so as to be present in the coating formed of the first ultraviolet-curable paint does not adversely affect the smoothness of the second ultraviolet-curable paint.

Furthermore, since the first ultraviolet-curable paint is incompletely cured, the adhesion between the first ultraviolet-curable paint and the second ultraviolet-curable paint is improved. In an adhesion test performed on the coating formed of the first ultraviolet-curable paint and the coating formed of the second ultraviolet-curable paint, the peeled-off area percentage of the coatings is 10% or less. Thus, these coatings have excellent adhesion.

The adhesion test is performed by attaching an adhesive tape to an uppermost surface of a test piece with pressure and observing the state of coatings after the adhesive tape is detached from the test piece.

The term "complete curing" means that an ultraviolet-curable paint is cured at an ultraviolet dose higher than or equal to the ultraviolet dose required for completely curing the ultraviolet-curable paint.

In other words, the term "complete curing" means that curing does not proceed any more even by further irradiation with ultraviolet rays.

When the second ultraviolet-curable paint is completely cured by irradiation with ultraviolet rays in the second step, the incompletely cured first ultraviolet-curable paint is also completely cured by the irradiation with ultraviolet rays in the second step.

In the first step, therefore, the first ultraviolet-curable paint is preferably applied so that the ultraviolet dose required for complete curing is lower than the ultraviolet dose required for completely curing the second ultraviolet-curable paint applied in the second step.

Specifically, the amount of the first ultraviolet-curable paint applied in the first step may be smaller than the amount of the second ultraviolet-curable paint applied in the second step. Alternatively, a paint whose ultraviolet dose required for curing is lower than or equal to that of the second ultraviolet-curable paint may be used as the first ultraviolet-curable paint.

The coating formed of the second ultraviolet-curable paint is polished in the third step. Therefore, the second ultraviolet-curable paint preferably contains a filler in an amount of 40 to 70 mass % in terms of solid content of the second ultraviolet-curable paint.

Examples of the filler include talc, calcium carbonate, silica (crystalline silica, fused silica, and amorphous silica), glass (glass flake and powdered glass fiber), quartz (powder), aluminum (powder), and mica (powder). These fillers may be used alone or in combination of two or more.

In the third step, the cured second ultraviolet-curable paint is polished to smoothen the surface of the cured second ultraviolet-curable paint.

The cured second ultraviolet-curable paint is preferably polished so as to have a thickness of 10 to 130 μm.

The polishing is performed by any typical method such as polishing with sandpaper, buffing, or belt polishing.

The enamel paint is used to mirror-finish the surface of the building material.

The enamel paint contains a resin for enamel paints and a pigment.

Any resin for enamel paints may be used, such as fluororesin, acrylic resin, urethane resin, or acrylic silicone resin.

Examples of the pigment include titanium oxide, carbon, red iron oxide, chrome yellow, iron oxide, ultramarine, phthalocyanine blue, cobalt, and chromium oxide.

According to the method for producing a building material in this embodiment, even when coatings are directly formed on the inorganic material containing the woody reinforcement, a building material whose uppermost surface is smooth can be provided.

Hereafter, the building material according to embodiments of the present invention will be described with reference to the attached drawings.

First Embodiment of the Present Invention

Figure 1:
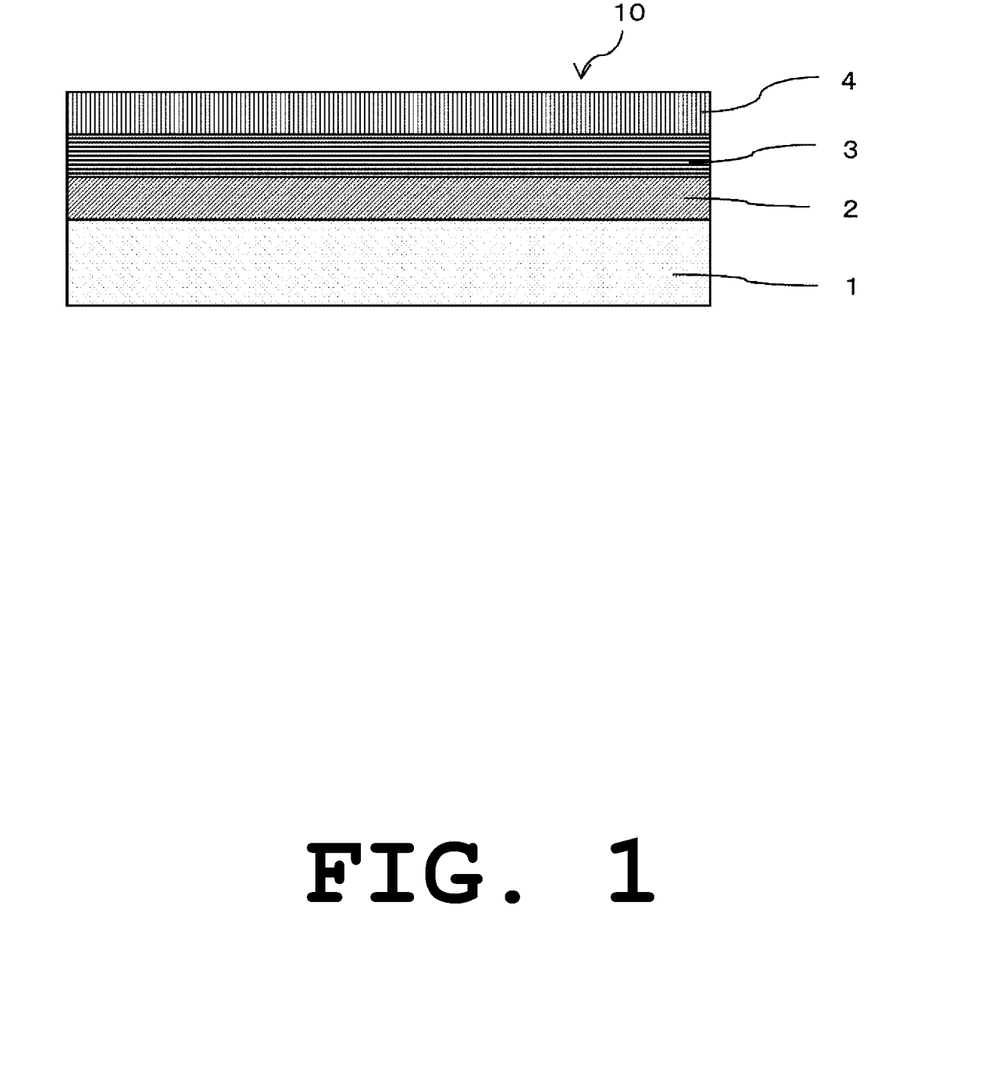
FIG. 1 is an enlarged sectional view illustrating a part of a building material produced in a first embodiment of the present invention.

FIG. 1 is an enlarged sectional view illustrating a part of a building material produced in a first embodiment of the present invention.

A building material 10 in FIG. 1 includes an inorganic material 1, a first ultraviolet-cured coating 2 formed on the surface of the inorganic material 1, a second ultraviolet-cured coating 3 formed on the surface of the first ultraviolet-cured coating 2, and an enamel (mirror-finishing) coating 4 formed on the surface of the second ultraviolet-cured coating 3.

In the method for producing the building material 10, the inorganic material 1 is polished to obtain a smooth surface. The polishing is performed by any typical method such as polishing with sandpaper, buffing, or belt polishing.

For example, polishing is performed using a belt sander with a plurality of heads.

Examples of the inorganic material 1 include wood cement board, wood wool cement board, pulp fiber reinforced cement board, wood flake reinforced cement calcium silicate board, and wood fiber reinforced cement calcium silicate board. Each of them contains a woody reinforcement.

Examples of the woody reinforcement include wood powder, wood wool, wood flake, wood fiber, wood fiber bundle, and pulp.

The inorganic material preferably contains 5 mass % or more and 30 mass % or less of the woody reinforcement in terms of solid content of the inorganic material because such an inorganic material has excellent bending strength and toughness.

Subsequently, a first ultraviolet-curable paint is applied onto the surface of the inorganic material 1 and irradiated with ultraviolet rays to incompletely cure the first ultraviolet-curable paint.

The first ultraviolet-curable paint contains a first ultraviolet-curable resin and a photoinitiator. The first ultraviolet-curable resin is a resin containing, as a main component, acrylic resin, epoxy resin, urethane resin, or the like.

The first ultraviolet-curable paint can be applied by a typical method that uses, for example, a spray, a flow coater, a natural coater, or a roll coater.

The term "incomplete curing" refers to a state of a paint that is not completely cured, but can be further cured by irradiation with ultraviolet rays.

The ultraviolet-curable paint is incompletely cured by performing irradiation at an ultraviolet dose lower than the ultraviolet dose required for completely curing the ultraviolet-curable paint.

For example, in the case of an ultraviolet-curable paint containing at least one of acrylic resin, epoxy resin, and urethane resin that requires an ultraviolet dose of 1.5 mJ/cm$^2$ per 1 µm thickness for completely curing the ultraviolet-curable paint, the ultraviolet-curable paint can be incompletely cured by being irradiated with ultraviolet rays at a dose of less than 1.5 mJ/cm$^2$ per 1 µm thickness.

The first ultraviolet-curable paint is completely cured together with the second ultraviolet-curable paint in a step of completely curing the second ultraviolet-curable paint. Therefore, a paint whose ultraviolet dose required for complete curing is lower than or equal to that of the second ultraviolet-curable paint is preferably used as the first ultraviolet-curable paint.

The first ultraviolet-curable paint is preferably applied in such an amount that a first ultraviolet-cured coating 2 to be formed has a thickness of 10 to 150 µm.

If the thickness is less than 10 µm, it is difficult to uniformly apply the first ultraviolet-curable paint. If the thickness is more than 150 µm, cracks are easily formed in the coating, which may degrade the incombustibility and the like. Furthermore, since the first ultraviolet-curable paint is completely cured together with the second ultraviolet-curable paint in a step performed later, the amount of the first ultraviolet-curable paint applied in the first step is preferably smaller than the amount of the second ultraviolet-curable paint applied in the second step.

The first ultraviolet-cured coating 2 is in contact with a woody reinforcement that appears on a polished surface of the inorganic material. The woody reinforcement in contact with the first ultraviolet-cured coating 2 may protrude from the inorganic material during formation of the first ultraviolet-cured coating 2, which adversely affects the smoothness of the surface of the first ultraviolet-cured coating 2.

Subsequently, a second ultraviolet-curable paint is applied onto the surface of the incompletely cured first ultraviolet-cured coating 2 and irradiated with ultraviolet rays to completely cure the second ultraviolet-curable paint. The second ultraviolet-curable paint contains a second ultraviolet-curable resin, a photoinitiator, and a filler.

The second ultraviolet-curable resin is a resin containing, as a main component, acrylic resin, epoxy resin, urethane resin, or the like.

The first ultraviolet-curable resin and the second ultraviolet-curable resin are preferably formed of the same resin to achieve good adhesion.

Examples of the filler include talc, calcium carbonate, silica (crystalline silica, fused silica, and amorphous silica), glass (glass flake and powdered glass fiber), quartz (powder), aluminum (powder), and mica (powder). These fillers may be used alone or in combination of two or more. The second ultraviolet-curable paint can be applied by a typical method that uses, for example, a spray, a flow coater, a natural coater, or a roll coater.

The term "complete curing" means that an ultraviolet-curable paint is cured at an ultraviolet dose higher than or equal to the ultraviolet dose required for completely curing the ultraviolet-curable paint (curing does not proceed any more even by further irradiation with ultraviolet rays).

The second ultraviolet-curable paint contains a filler in view of the polishing properties of the second ultraviolet-cured coating 3 formed of the second ultraviolet-curable paint. The content of the filler in the second ultraviolet-curable paint is preferably 40 mass % or more and 70 mass % or less in terms of solid content of the second ultraviolet-curable paint.

The second ultraviolet-curable paint is preferably applied in such an amount that a second ultraviolet-cured coating 3 to be formed has a thickness of 30 to 150 µm.

If the thickness is less than 30 µm, it is difficult to uniformly apply the second ultraviolet-curable paint. If the thickness is larger than 150 µm, cracks are easily formed in the coating, which may degrade the incombustibility and the like.

Subsequently, the cured second ultraviolet-cured coating 3 is polished to smoothen the surface of the second ultraviolet-cured coating 3. The polishing is performed by any typical method such as polishing with sandpaper, buffing, or belt polishing.

For example, the polishing is performed by using a sandpaper #320 and then a sandpaper #400.

The polishing is performed until the second ultraviolet-cured coating 3 is smoothened. Normally, the second ultraviolet-cured coating 3 is polished by about 20 µm. The thickness of the second ultraviolet-cured coating 3 after the polishing is 10 to 130 µm.

Subsequently, an enamel paint is applied onto the polished surface of the second ultraviolet-cured coating 3 and dried with a dryer at 50° C. to 120° C.

The enamel paint contains a resin for enamel paints and a pigment. Examples of the resin for enamel paints include fluororesin, acrylic resin, urethane resin, and acrylic silicone resin.

Examples of the pigment include titanium oxide, carbon, red iron oxide, chrome yellow, iron oxide, ultramarine, phthalocyanine blue, cobalt, and chromium oxide.

The enamel paint can be applied by a typical method that uses, for example, a spray, a flow coater, a natural coater, or a roll coater.

The enamel paint is preferably applied in such an amount that an enamel coating 4 to be formed has a thickness of 5 to 50 μm.

The first ultraviolet-curable paint is directly applied onto the surface of the inorganic material 1 and irradiated with ultraviolet rays to incompletely cure the first ultraviolet-curable paint. Thus, the woody reinforcement protruding from the inorganic material 1 is absorbed in the first ultraviolet-cured coating 2, which makes it possible to smoothen the surface of the first ultraviolet-cured coating 2.

Then, the second ultraviolet-curable paint is applied onto the surface of the incompletely cured first ultraviolet-cured coating 2 and irradiated with ultraviolet rays to completely cure the second ultraviolet-curable paint. By polishing the second ultraviolet-cured coating 3, the surface of the second ultraviolet-cured coating 3 can be further made smooth.

That is, the surface is smoothened to a certain degree by using the first ultraviolet-curable paint, and the surface is further smoothened by using the second ultraviolet-curable paint.

Then, the enamel paint is applied onto the smooth surface of the second ultraviolet-cured coating 3 and cured to form an enamel coating 4 having a smooth surface. Thus, a building material 10 having a mirror-finished surface is produced.

Second Embodiment of the Present Invention

Figure 2:
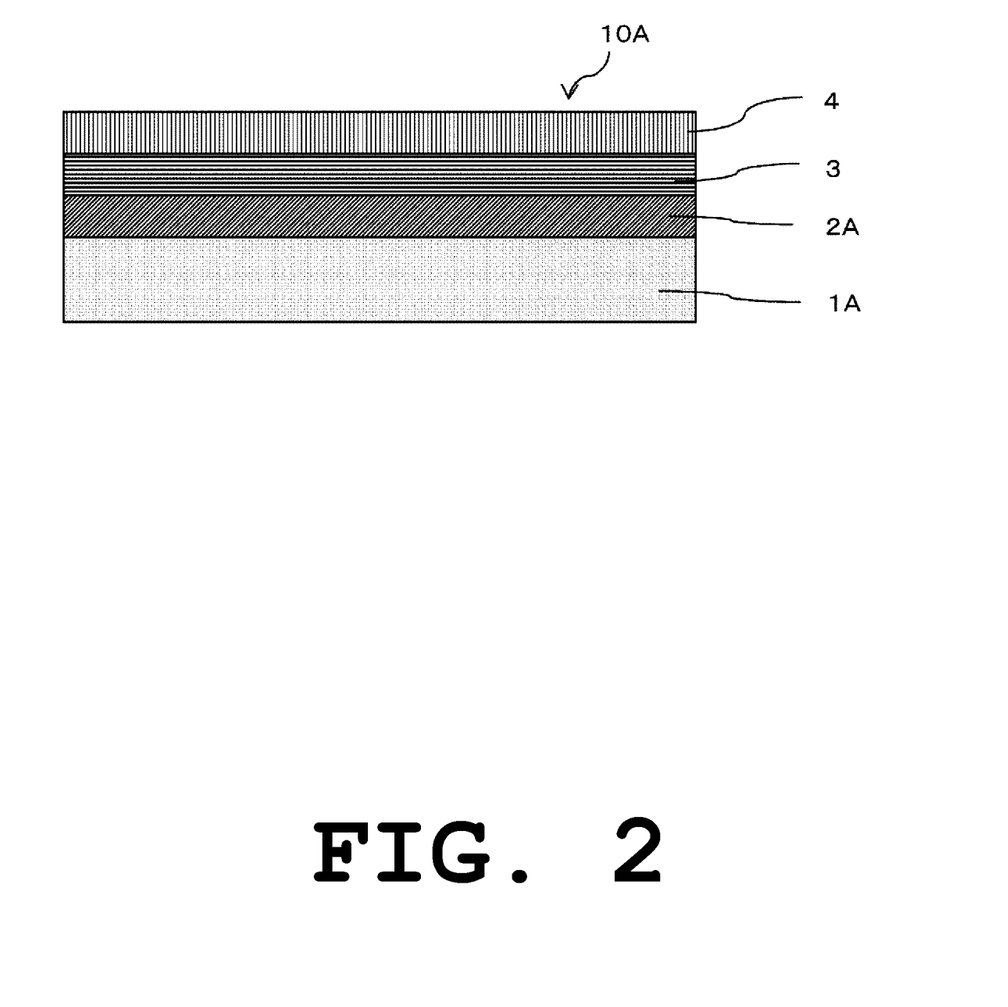
FIG. 2 is an enlarged sectional view illustrating a part of a building material produced in a second embodiment of the present invention.

FIG. 2 is an enlarged sectional view illustrating a part of a building material produced in a second embodiment of the present invention.

A building material 10A in FIG. 2 includes an inorganic material 1A, a first ultraviolet-cured coating 2A formed on the surface of the inorganic material 1A, a second ultraviolet-cured coating 3 formed on the surface of the first ultraviolet-cured coating 2A, and an enamel coating 4 formed on the surface of the second ultraviolet-cured coating 3.

Herein, the inorganic material 1A is obtained by coating the surface of the inorganic material 1 with a sealer. Any sealer may be used, such as a sealer formed of epoxy resin, acrylic resin, urethane resin, or the like.

The sealer can be applied by a typical method that uses, for example, a spray, a flow coater, a natural coater, or a roll coater. The sealer is also applied in any amount such as 3 g/square shaku (1 shaku=about 30.3 cm).

The first ultraviolet-cured coating 2A is formed of a first ultraviolet-curable resin, a photoinitiator, and a filler.

The first ultraviolet-curable resin, the photoinitiator, and the filler are the same as those of the building material 10.

The second ultraviolet-cured coating 3 and the enamel coating 4 are the same as those of the building material 10.

A method for producing the building material 10A will be roughly described. The method for producing the building material 10A is the same as the method for producing the building material 10, except that a sealer is applied onto the inorganic material 1A and the first ultraviolet-cured coating 2A is formed by a different method.

The method for forming the first ultraviolet-cured coating 2A is the same as the method for forming the first ultraviolet-cured coating 2, except that the first ultraviolet-curable paint is applied onto the surface (sealer-coated surface) of the inorganic material 1A and the first ultraviolet-curable paint contains a filler.

Third Embodiment of the Present Invention

Figure 3:
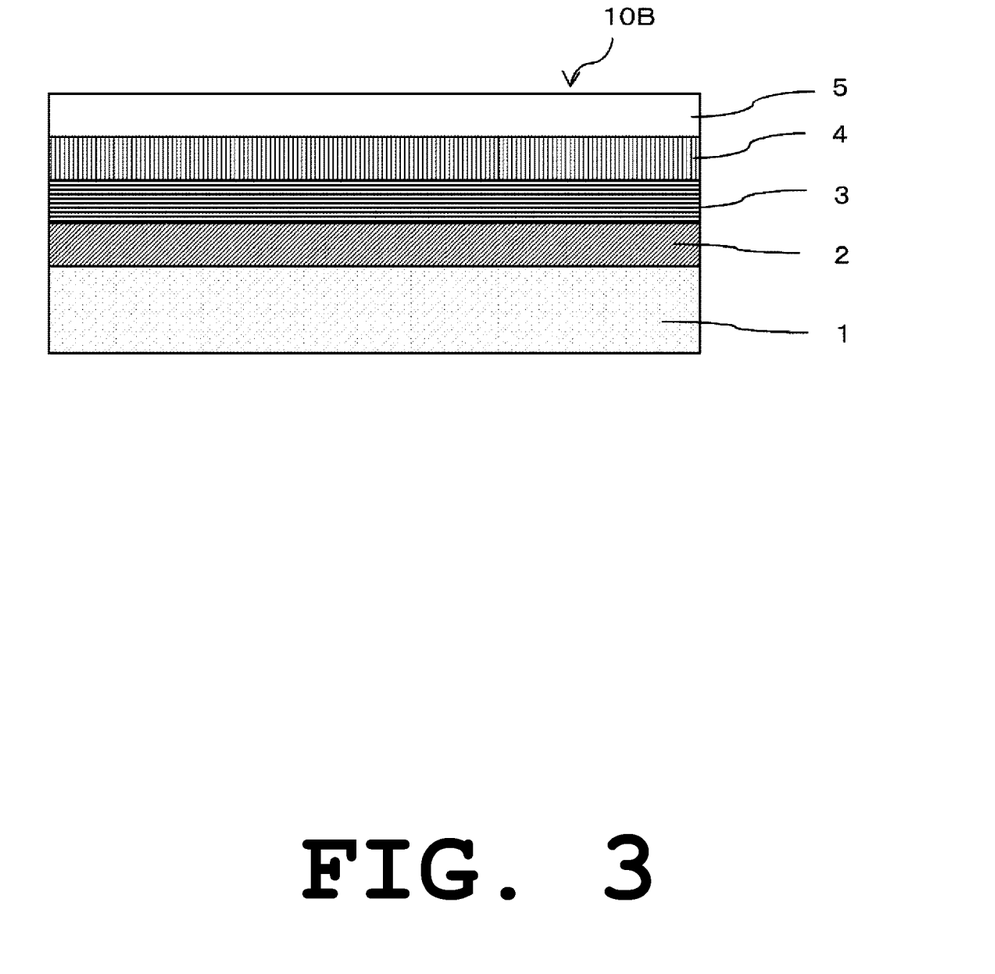
FIG. 3 is an enlarged sectional view illustrating a part of a building material produced in a third embodiment of the present invention.

FIG. 3 is an enlarged sectional view illustrating a part of a building material produced in a third embodiment of the present invention.

A building material 10B in FIG. 3 includes an inorganic material 1, a first ultraviolet-cured coating 2 formed on the surface of the inorganic material 1, a second ultraviolet-cured coating 3 formed on the surface of the first ultraviolet-cured coating 2, an enamel coating 4 formed on the surface of the second ultraviolet-cured coating 3, and a protective coating 5 formed on the surface of the enamel coating 4.

The protective coating 5 is formed of a protective resin. Examples of the protective resin include fluororesin, acrylic resin, urethane resin, and acrylic silicone resin.

The building material 10B including the protective coating 5 at its outermost surface is a building material having excellent weather resistance.

A method for producing the building material 10B will be roughly described. The method for producing the building material 10B is the same as the method for producing the building material 10 until the formation of the enamel coating 4.

A protective paint is applied onto the surface of the enamel coating 4 and dried with a dryer at 50° C. to 120° C.

The protective paint contains a protective resin. The protective paint can be applied by a typical method that uses a spray, a flow coater, a natural coater, a roll coater, or the like.

The protective paint is preferably applied in such an amount that a protective coating 5 to be formed has a thickness of 5 to 50 μm.

Verification Experiments and Results

The present inventors conducted experiments for verifying various properties of the building material according to an embodiment of the present invention. In these experiments, test pieces serving as samples 1 to 20 were prepared, and surface observation of each test piece, measurement of specular gloss at 60°, check of adhesion, and check of influence of a woody reinforcement (whether the surface of the second ultraviolet-cured coating is affected by protrusion of the woody reinforcement) were performed. The inorganic material used had a flat surface. Tables 1 and 2 below show materials for the test pieces, thicknesses, contents of pigments and fillers, and evaluation results. The first ultraviolet-curable paints and the second ultraviolet-curable paints used in these experiments and containing any of acrylic resin, urethane resin, epoxy resin, and acrylic/epoxy resin require an ultraviolet dose of 1.5 mJ/cm$^2$ per 1 μm thickness for complete curing.

TABLE 1

|  |  |  | Sample 1 | Sample 2 | Sample 3 | Sample 4 | Sample 5 |
|---|---|---|---|---|---|---|---|
| Protective paint | Resin | Type | — | — | — | — | — |
| Enamel paint | Resin | Type | fluororesin | fluororesin | fluororesin | urethane | urethane |
|  | Pigment (*1) | Content (*3) | 2% | 2% | 2% | 2% | 2% |
| Second ultraviolet-curable paint | Resin | Type | UV-curable acrylic | UV-curable acrylic | UV-curable acrylic | UV-curable urethane | UV-curable urethane |
|  | Filler (*2) | Content (*3) | 40% | 55% | 60% | 40% | 55% |
| First ultraviolet-curable paint | Resin | Type | UV-curable acrylic | UV-curable acrylic | UV-curable acrylic | UV-curable urethane | UV-curable urethane |
|  | Filler (*2) | Content (*3) | — | — | — | 40% | 55% |
| Inorganic material |  | Type | Wood flake reinforced cement calcium silicate board | Wood flake reinforced cement calcium silicate board | Wood flake reinforced cement calcium silicate board | Wood flake reinforced cement calcium silicate board whose surface is coated with urethane resin paint | Pulp fiber reinforced cement board whose surface is coated with urethane resin paint |
|  |  | Content of woody reinforcement | 20% | 20% | 20% | 20% | 10% |
| Curing conditions | Protective coating | Drying temperature | — | — | — | — | — |
|  | Fourth step | Drying temperature | 90° C. | 90° C. | 90° C. | 90° C. | 90° C. |
|  | Second step | Ultraviolet dose | 350 mJ/cm² | 320 mJ/cm² | 320 mJ/cm² | 350 mJ/cm² | 350 mJ/cm² |
|  |  | Ultraviolet dose (*4) | 2.2 mJ/cm²·μm | 2 mJ/cm²·μm | 2.7 mJ/cm²·μm | 1.9 mJ/cm²·μm | 1.9 mJ/cm²·μm |
|  | First step | Ultraviolet dose | 10 mJ/cm² | 37 mJ/cm² | 37 mJ/cm² | 37 mJ/cm² | 37 mJ/cm² |
|  |  | Ultraviolet dose (*5) | 1 mJ/cm²·μm | 0.9 mJ/cm²·μm | 0.9 mJ/cm²·μm | 1.2 mJ/cm²·μm | 1.2 mJ/cm²·μm |
| Thickness | Protective coating |  | — | — | — | — | — |
|  | Enamel coating |  | 30 μm | 30 μm | 30 μm | 25 μm | 25 μm |
|  | Second ultraviolet-cured coating | before polishing | 150 μm | 120 μm | 80 μm | 150 μm | 150 μm |
|  |  | after polishing | 130 μm | 100 μm | 60 μm | 130 μm | 130 μm |
|  | First ultraviolet-cured coating |  | — | 10 μm | 40 μm | 40 μm | 30 μm | 30 μm |
| Checking items | Influence of woody reinforcement |  | No | No | No | No | No |
|  | Surface observation |  | Good | Good | Good | Good | Good |
|  | Specular gloss at 60° |  | Good | Good | Good | Good | Good |
|  | Adhesion |  | Good | Good | Good | Good | Good |

|  |  |  | Sample 6 | Sample 7 | Sample 8 | Sample 9 | Sample 10 |
|---|---|---|---|---|---|---|---|
| Protective paint | Resin | Type | — | acrylic silicone | acrylic silicone | acrylic silicone | fluororesin |
| Enamel paint | Resin | Type | urethane | acrylic | acrylic | acrylic | fluororesin |
| Pigment (*1) | Content (*3) |  | 2% | 2% | 2% | 2% | 2% |
| Second ultraviolet-curable paint | Resin | Type | UV-curable urethane | UV-curable acrylic/UV-curable epoxy | UV-curable acrylic/UV-curable epoxy | UV-curable acrylic/UV-curable epoxy | UV-curable epoxy |
|  | Filler (*2) | Content (*3) | 70% | 40% | 55% | 70% | 40% |
| First ultraviolet-curable paint | Resin | Type | UV-curable urethane | UV-curable acrylic/UV-curable epoxy | UV-curable acrylic/UV-curable epoxy | UV-curable urethane | UV-curable epoxy |
|  | Filler (*2) | Content (*3) | 70% | — | — | — | 50% |
| Inorganic material |  | Type | Wood flake reinforced cement calcium silicate board whose surface is coated with urethane resin paint | Wood flake reinforced cement calcium silicate board | Wood flake reinforced cement calcium silicate board | Wood flake reinforced cement calcium silicate board | Pulp fiber reinforced cement board whose surface is coated with urethane resin paint |
|  |  | Content of woody reinforcement | 20% | 30% | 30% | 30% | 5% |
| Curing conditions | Protective coating | Drying temperature | — | 100° C. | 100° C. | 100° C. | 100° C. |
|  | Fourth step | Drying temperature | 90° C. | 80° C. | 80° C. | 80° C. | 90° C. |

TABLE 1-continued

|  |  |  |  |  |  |  |  |
|---|---|---|---|---|---|---|---|
|  | Second step | Ultraviolet dose | 250 mJ/cm$^2$ | 250 mJ/cm$^2$ | 350 mJ/cm$^2$ | 410 mJ/cm$^2$ | 320 mJ/cm$^2$ |
|  |  | Ultraviolet dose (*4) | 4.2 mJ/cm$^2$·μm | 6.3 mJ/cm$^2$·μm | 1.9 mJ/cm$^2$·μm | 1.5 mJ/cm$^2$·μm | 2.1 mJ/cm$^2$·μm |
|  | First step | Ultraviolet dose | 37 mJ/cm$^2$ | 10 mJ/cm$^2$ | 37 mJ/cm$^2$ | 50 mJ/cm$^2$ | 37 mJ/cm$^2$ |
|  |  | Ultraviolet dose (*5) | 1.2 mJ/cm$^2$·μm | 1 mJ/cm$^2$·μm | 1.2 mJ/cm$^2$·μm | 0.3 mJ/cm$^2$·μm | 1.2 mJ/cm$^2$·μm |
| Thickness | Protective coating |  | — | 20 μm | 20 μm | 20 μm | 30 μm |
|  | Enamel coating |  | 25 μm | 20 μm | 20 μm | 20 μm | 30 μm |
|  | Second ultraviolet-cured coating | before polishing | 30 μm | 30 μm | 150 μm | 120 μm | 120 μm |
|  |  | after polishing | 10 μm | 10 μm | 30 μm | 100 μm | 100 μm |
|  | First ultraviolet-cured coating |  | 30 μm | 10 μm | 30 μm | 150 μm | 30 μm |
| Checking items | Influence of woody reinforcement |  | No | No | No | No | No |
|  | Surface observation |  | Good | Good | Good | Good | Good |
|  | Specular gloss at 60° |  | Good | Good | Good | Good | Good |
|  | Adhesion |  | Good | Good | Good | Good | Good |

*1: Carbon was used as a pigment.
*2: Talc, calcium carbonate, and silica were used as a filler.
*3: In terms of solid content
*4: Ultraviolet dose per thickness in the second step (determined from "Ultraviolet dose in the second step/(Thickness of first ultraviolet-cured coating + Thickness of second ultraviolet-cured coating)")
*5: Ultraviolet dose per thickness in the first step (determined from "Ultraviolet dose in the first step/Thickness of first ultraviolet-cured coating")

TABLE 2

|  |  |  | Sample 11 | Sample 12 | Sample 13 | Sample 14 | Sample 15 |
|---|---|---|---|---|---|---|---|
| Protective paint | Resin | Type | fluororesin | fluororesin | — | acrylic silicone | — |
| Enamel paint | Resin | Type | fluororesin | fluororesin | fluororesin | acrylic | fluororesin |
|  | Pigment (*1) | Content (*3) | 2% | 2% | 2% | 2% | 2% |
| Second ultraviolet-curable paint | Resin | Type | UV-curable epoxy | UV-curable epoxy | UV-curable acrylic | UV-curable acrylic/UV-curable epoxy | UV-curable acrylic |
|  | Filler (*2) | Content (*3) | 55% | 40% | 70% | 70% | 55% |
| First ultraviolet-curable paint | Resin | Type | UV-curable epoxy | UV-curable epoxy | UV-curable urethane | UV-curable urethane | UV-curable acrylic |
|  | Filler (*2) | Content (*3) | 60% | 70% | 40% | 40% | 55% |
| Inorganic material |  | Type | Pulp fiber reinforced cement board whose surface is coated with urethane resin paint | Pulp fiber reinforced cement board whose surface is coated with urethane resin paint | Wood flake reinforced cement calcium silicate board whose surface is coated with urethane resin paint | Wood flake reinforced cement calcium silicate board | Wood flake reinforced cement calcium silicate board whose surface is coated with urethane resin paint |
|  |  | Content of woody reinforcement | 5% | 5% | 20% | 30% | 20% |
| Curing conditions | Protective coating | Drying temperature | 100° C. | 100° C. | — | 100° C. | — |
|  | Fourth Step | Drying temperature | 90° C. | 90° C. | 90° C. | 80° C. | 90° C. |
|  | Second Step | Ultraviolet dose | 320 mJ/cm$^2$ | 320 mJ/cm$^2$ | 360 mJ/cm$^2$ | 410 mJ/cm$^2$ | 320 mJ/cm$^2$ |
|  |  | Ultraviolet dose (*4) | 2.7 mJ/cm$^2$·μm | 4 mJ/cm$^2$·μm | 2 mJ/cm$^2$·μm | 1.5 mJ/cm$^2$·μm | 2.1 mJ/cm$^2$·μm |
|  | First step | Ultraviolet dose | 37 mJ/cm$^2$ | 20 mJ/cm$^2$ | 50 mJ/cm$^2$ | 50 mJ/cm$^2$ | 320 mJ/cm$^2$ |
|  |  | Ultraviolet dose (*4) | 0.9 mJ/cm$^2$·μm | 1 mJ/cm$^2$·μm | 0.3 mJ/cm$^2$·μm | 0.3 mJ/cm$^2$·μm | 10.7 mJ/cm$^2$·μm |
| Thickness | Protective coating |  | 30 μm | 30 μm | — | 20 μm | — |
|  | Enamel coating |  | 30 μm | 30 μm | 30 μm | 20 μm | 30 μm |
|  | Second ultraviolet-cured coating | before polishing | 80 μm | 60 μm | 30 μm | 120 μm | 120 μm |
|  |  | after polishing | 60 μm | 40 μm | 10 μm | 100 μm | 100 μm |
|  | First ultraviolet-cured coating |  | 40 μm | 20 μm | 150 μm | 150 μm | 30 μm |

TABLE 2-continued

| | | | Sample 11 | Sample 12 | Sample 13 | Sample 14 | Sample 15 |
|---|---|---|---|---|---|---|---|
| Checking items | Influence of woody reinforcement | | No | No | No | No | No |
| | Surface observation | | Good | Good | Good | Good | Good |
| | Specular gloss at 60° | | Good | Good | Good | Good | Good |
| | Adhesion | | Good | Good | Good | Good | Poor |

| | | | Sample 16 | Sample 17 | Sample 18 | Sample 19 | Sample 20 |
|---|---|---|---|---|---|---|---|
| Protective paint | Resin | Type | — | — | — | — | — |
| Enamel paint | Resin | Type | fluororesin | fluororesin | fluororesin | fluororesin | fluororesin |
| | Pigment (*1) | Content (*3) | 2% | 2% | 2% | 2% | 2% |
| Second ultraviolet-curable paint | Resin | Type | UV-curable epoxy | UV-curable urethane | UV-curable acrylic | UV-curable urethane | UV-curable urethane |
| | Filler (*2) | Content (*3) | 75% | 34% | 55% | 55% | 55% |
| First ultraviolet-curable paint | Resin | Type | UV-curable epoxy | UV-curable urethane | — | — | — |
| | Filler (*2) | Content (*3) | 75% | 34% | — | — | — |
| Inorganic material | | Type | Pulp fiber reinforced cement board whose surface is coated with urethane resin paint | Wood flake reinforced cement calcium silicate board whose surface is coated with urethane resin paint | Wood flake reinforced cement calcium silicate board whose surface is coated with urethane resin paint | Pulp fiber reinforced cement board whose surface is coated with urethane resin paint | Wood flake reinforced cement calcium silicate board whose surface is coated with urethane resin paint |
| | | Content of woody reinforcement | 5% | 20% | 20% | 10% | 35% |
| Curing conditions | Protective coating | Drying temperature | — | — | — | — | — |
| | Fourth Step | Drying temperature | 90° C. | 90° C. | 90° C. | 90° C. | 90° C. |
| | Second Step | Ultraviolet dose | 320 mJ/cm² | 350 mJ/cm² | 350 mJ/cm² | 350 mJ/cm² | 350 mJ/cm² |
| | | Ultraviolet dose (*4) | 2.1 mJ/cm² · μm | 2.2 mJ/cm² · μm | 2.3 mJ/cm² · μm | 2.3 mJ/cm² · μm | 2.3 mJ/cm² · μm |
| | First step | Ultraviolet dose | 37 mJ/cm² | 10 mJ/cm² | — | — | — |
| | | Ultraviolet dose (*4) | 1.2 mJ/cm² · μm | 1 mJ/cm² · μm | — | — | — |
| Thickness | Protective coating | | — | — | — | — | — |
| | Enamel coating | | 30 μm | 30 μm | 30 μm | 30 μm | 30 μm |
| | Second ultraviolet-cured coating | before polishing | 120 μm | 150 μm | 150 μm | 150 μm | 150 μm |
| | | after polishing | 100 μm | 130 μm | 130 μm | 130 μm | 130 μm |
| | First ultraviolet-cured coating | | 30 μm | 10 μm | — | — | — |
| Checking items | Influence of woody reinforcement | | No | No | Yes | Yes | Yes |
| | Surface observation | | Poor | Poor | Poor | Poor | Poor |
| | Specular gloss at 60° | | Poor | Poor | Poor | Poor | Poor |
| | Adhesion | | Fair | Fair | Good | Good | Good |

*1: Carbon was used as a pigment.
*2: Talc, calcium carbonate, and silica were used as a filler.
*3: In terms of solid content
*4: Ultraviolet dose per thickness in the second step (determined from the "Ultraviolet dose in the second step/(Thickness of first ultraviolet-cured coating + Thickness of second ultraviolet-cured coating)")
*5: Ultraviolet dose per thickness in the first step (determined from "Ultraviolet dose in the first step/Thickness of first ultraviolet-cured coating")

The "check of influence of a woody reinforcement" was conducted by observing the surface of the second ultraviolet-cured coating through visual inspection. When surface undulations due to the protrusion of the woody reinforcement were observed, an evaluation outcome of "Yes" was given. When the surface undulations were not observed, an evaluation outcome of "No" was given.

The "surface observation" was conducted by placing the test pieces two meters below a fluorescent lamp and observing a reflection of the fluorescent lamp on the coating surface through visual inspection. When the reflection of the fluorescent lamp appeared to be a straight line, an evaluation outcome of "Good" was given. When the reflection of the fluorescent lamp wavered or appeared blurred, an evaluation outcome of "Poor" was given.

The "specular gloss at 60°" was determined by measuring the uppermost surface of each test piece in conformity with JIS K 5600-4-7 using a Gloss Checker (IG-320 manufactured by HORIBA, Ltd.). When the specular gloss at 60° was 80 or more, an evaluation outcome of "Good" was given. When the specular gloss at 60° was less than 80, an evaluation outcome of "Poor" was given.

The "check of adhesion" was conducted by attaching an adhesive tape to the uppermost surface of each test piece with pressure and observing the state of coatings after the adhesive tape was detached. When the first ultraviolet-cured coating and the second ultraviolet-cured coating were not detached, an evaluation outcome of "Good" was given. When the first ultraviolet-cured coating or the second ultraviolet-cured coating was detached, an evaluation outcome of "Poor" was given.

As is shown from the results in Tables 1 and 2, the samples 1 to 14 prepared by incompletely curing the first ultraviolet-curable paint at an ultraviolet dose of less than 1.5 mJ/cm² in the first step (formation of the first ultraviolet-cured coating) show good results in all of the check of influence of a woody reinforcement, the surface observation, the specular gloss at 60°, and the check of adhesion.

In contrast, the sample 15 prepared by completely curing the first ultraviolet-curable paint at an ultraviolet dose of 1.5 mJ/cm² or more in the first step (formation of the first ultraviolet-cured coating) has no problem in terms of the check of influence of a woody reinforcement, the surface observation, and the specular gloss at 60°, but shows poor results in terms of adhesion. The samples 16 and 17 prepared by incompletely curing the first ultraviolet-curable paint at an ultraviolet dose of less than 1.5 mJ/cm² in the first step (formation of the first ultraviolet-cured coating), but prepared by setting the content of the filler in the second ultraviolet-curable paint outside the range of 40% to 70% show poor results in all of the check of influence of a woody reinforcement, the surface observation, the specular gloss at 60°, and the check of adhesion. The reason for this is believed to be as follows. In the sample 16, the content of the filler in the second ultraviolet-curable paint is high and thus the viscosity of the paint is unstable, which makes it difficult to uniformly apply the paint. Furthermore, a large amount of filler prevents formation of a smooth surface of the second ultraviolet-cured coating. In the sample 17, the content of the filler in the second ultraviolet-curable paint is low, which degrades the polishing properties of the second ultraviolet-cured coating. The samples 18 to 20 prepared without forming the first ultraviolet-cured coating show poor results in terms of the surface observation because the second ultraviolet-cured coating includes the woody reinforcement.

The embodiments of the present invention have been described in detail with reference to the attached drawings, but specific structures are not limited to the structures in these embodiments. Design variations and the like made without departing from the scope of the present invention are included in the present invention.

As described above, the present invention can provide a building material in which coatings are directly formed on an inorganic material containing a woody reinforcement and the coatings have a satisfactorily mirror-finished uppermost surface.

What is claimed is:

1. A method for producing a building material, comprising:
   a first step of polishing a flat surface of an inorganic material containing a woody reinforcement;
   a second step of applying a first ultraviolet-curable paint onto the flat surface of the inorganic material, and incompletely curing the first ultraviolet-curable paint to form a first incompletely ultraviolet-cured coating on the inorganic material by irradiating a ultraviolet ray at a dose of less than 1.5 mJ/cm² per 1 μm thickness of the first incompletely ultraviolet-cured coating, so that the woody reinforcement on the surface of the inorganic material is fixed in the first incompletely ultraviolet-cured coating and the first incompletely ultraviolet-cured coating has a surface which is smoother than the surface of the inorganic material;
   a third step of applying a second ultraviolet-curable paint onto the surface of the first incompletely ultraviolet-cured coating while the first ultraviolet-curable paint is incompletely cured, and completely curing the first incompletely ultraviolet-cured coating and the second ultraviolet-curable paint, so that the second ultraviolet-cured coating is formed on the first ultraviolet-cured coating;
   a fourth step of polishing the second ultraviolet-cured coating to smoothen a surface of the second ultraviolet-cured coating, so that the surface of the second ultraviolet-cured coating is smoother than the surface of the first incompletely ultraviolet-cured coating; and
   a fifth step of applying an enamel paint onto the polished surface of the second ultraviolet-cured coating, and curing the enamel paint, so that an enamel coating is formed on the second ultraviolet-cured coating and the building material has a flat mirror-finished surface, wherein
   the inorganic material contains more than 15 mass % and 30 mass % or less of the woody reinforcement in terms of solid content of the inorganic material,
   in the third step, the second ultraviolet-curable paint contains 40 to 70 mass % of a filler in terms of solid content,
   in the second step, the first ultraviolet-curable paint is applied in such an amount that a coating formed of the first ultraviolet-curable paint has a thickness of 10 to 150 μm, in the third step, the second ultraviolet-curable paint is applied in such an amount that a coating formed of the second ultraviolet-curable paint has a thickness of 30 to 150 μm, and in the fourth step, the completely cured second ultraviolet-curable paint is polished so that the second ultraviolet-cured coating has a thickness of 10 to 130 μm, and a total thickness of the first ultraviolet-cured coating and the second ultraviolet-cured coating is 100 to 250 μm, and
   a thickness of the enamel coating is 5 to 50 μm, and
   the first ultraviolet-curable paint is applied onto the surface of the inorganic material and incompletely cured to fix the woody reinforcement on the surface of the inorganic material in the first incompletely ultraviolet-cured coating, so that the second ultraviolet-cured coating does not contain the woody reinforcement.

2. The method according to claim 1, wherein
the amount of the second ultraviolet-curable paint applied in the third step is larger than the amount of the first ultraviolet-curable paint applied in the second step.

3. The method according to claim 1, wherein
the first ultraviolet-curable paint and the second ultraviolet-curable paint contain, as a main component, at least one of acrylic resin, epoxy resin, and urethane resin.

4. The method according to claim 1, wherein
in the second step, the first ultraviolet-curable paint is a paint containing 40 to 70 mass % of a filler in terms of solid content.

5. The method according to claim 1, further comprising the step of:
- applying a protective paint onto an uppermost surface of the building material; and
- drying the protective paint at 90 to 120° C., wherein
- the protective paint comprises, as a main component, at least one resin selected from the group consisting of fluororesin, acrylic resin, urethane resin, and acrylic silicone resin.

6. The method according to claim 1, wherein
a total thickness of the first ultraviolet-cured coating and the second ultraviolet-cured coating is thicker than the thickness of the enamel coating.

7. The method according to claim 1, wherein
the enamel paint comprises a fluororesin.

8. The method according to claim 1, wherein in the fifth step, the enamel paint is dried at 80 to 120° C.

9. The method according to claim 1, wherein
the inorganic material contains 20 mass % to 30 mass % of the woody reinforcement in terms of solid content of the inorganic material.

10. The method according to claim 1, wherein in the fifth step, the enamel paint is dried at 90 to 120° C.

11. The method according to claim 1, wherein the inorganic material is a wood cement board, a wood wool cement board, a pulp fiber reinforced cement board, a wood flake reinforced cement calcium silicate board, or a wood fiber reinforced cement calcium silicate board.

* * * * *